(12) United States Patent
Usui et al.

(10) Patent No.: US 9,786,306 B2
(45) Date of Patent: Oct. 10, 2017

(54) FAILURE PROGNOSIS DEVICE, METHOD, AND STORAGE SYSTEM

(71) Applicant: KABUSHIKI KAISHA TOSHIBA, Tokyo (JP)

(72) Inventors: Takashi Usui, Saitama (JP); Toshiaki Ohgushi, Kanagawa (JP); Takeichiro Nishikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/230,796

(22) Filed: Aug. 8, 2016

(65) Prior Publication Data
US 2017/0047086 A1     Feb. 16, 2017

(30) Foreign Application Priority Data

Aug. 11, 2015   (JP) .................................. 2015-158863

(51) Int. Cl.
| | |
|---|---|
| G11B 20/00 | (2006.01) |
| G11B 27/36 | (2006.01) |
| G11B 5/40 | (2006.01) |
| G11B 19/04 | (2006.01) |

(52) U.S. Cl.
CPC .............. *G11B 5/40* (2013.01); *G11B 19/041* (2013.01)

(58) Field of Classification Search
CPC ..... G11B 5/012; G11B 27/36; G11B 27/3027; G11B 2220/90; G11B 20/1403; G11B 5/09; G11B 5/5927; G11B 5/596; G11B 2220/20; G11B 20/1816

USPC ... 360/25, 62, 67, 53, 48, 51, 31, 77.02, 75; 369/53.1, 53.42
See application file for complete search history.

(56) References Cited

U.S. PATENT DOCUMENTS

| | | | |
|---|---|---|---|
| 7,020,061 B2 * | 3/2006 | Chu ..................... | H01S 5/06825 369/47.51 |
| 7,359,134 B2 | 4/2008 | Komatsu | |
| 7,881,006 B2 * | 2/2011 | Raghunathan ....... | G11B 5/3166 360/77.02 |
| 7,982,987 B2 * | 7/2011 | Deng ..................... | G11B 5/455 360/25 |
| 8,341,121 B1 | 12/2012 | Claudatos et al. | |
| 2007/0230001 A1 | 10/2007 | Imamura et al. | |
| 2014/0143610 A1 | 5/2014 | Nakatsugawa et al. | |

FOREIGN PATENT DOCUMENTS

| | | |
|---|---|---|
| JP | 2001-312375 | 11/2001 |
| JP | 2007-35217 | 2/2007 |
| JP | 2007-272977 | 10/2007 |
| JP | 2014-102636 | 6/2014 |

* cited by examiner

*Primary Examiner* — Nabil Hindi
(74) *Attorney, Agent, or Firm* — Finnegan, Henderson, Farabow, Garrett & Dunner, L.L.P.

(57) ABSTRACT

According to one embodiment, a failure prognosis device includes circuitry configured to determine whether a sign of failure exists in a head, based on a signal quality value and a floating quantity of the head, the signal quality value being based on an error between a reproducing signal acquired from the head when reading data stored on a storage surface of a disk and a predetermined target signal, and output a determination result.

6 Claims, 14 Drawing Sheets

FAILURE PROGNOSIS DEVICE, METHOD, AND STORAGE SYSTEM

CROSS-REFERENCE TO RELATED APPLICATIONS

This application is based upon and claims the benefit of priority from Japanese Patent Application No. 2015-158863, filed Aug. 11, 2015; the entire contents of which are incorporated herein by reference.

FIELD

Embodiments described herein pertain to a failure prognosis device, a method, and a storage system.

BACKGROUND

A method of using an error rate of errors accumulated on a head-by-head basis has hitherto been known as a method of detecting a sign of failure of a hard disk apparatus. However, the conventional method was incapable of distinguishing between an error due to a failure of a head and an error due to abnormality (e.g., flaw produced on a storage surface, an impurity adhered onto the storage surface, and other equivalent causes) of a platter 101.

When the head gets into a failure, the whole storage surface undergoing read and write by the head is disabled from being used. By contrast, when the abnormality occurs in the platter, areas other than the area having the occurrence of the abnormality are still usable. Thus, requested maintenance (for preserving data) differed depending on causes of the errors, and hence the conventional method incapable of distinguishing between the causes of the errors was hard to perform the proper maintenance even when detecting the sign of failure.

DETAILED DESCRIPTION

According to one embodiment, a failure prognosis device includes circuitry configured to determine whether a sign of failure exists in a head, based on a signal quality value and a floating quantity of the head, the signal quality value being based on an error between a reproducing signal acquired from the head when reading data stored on a storage surface of a disk and a predetermined target signal, and output a determination result.

Embodiments of the present invention will hereinafter be described with reference to the drawings.

First Embodiment

Figure 1:
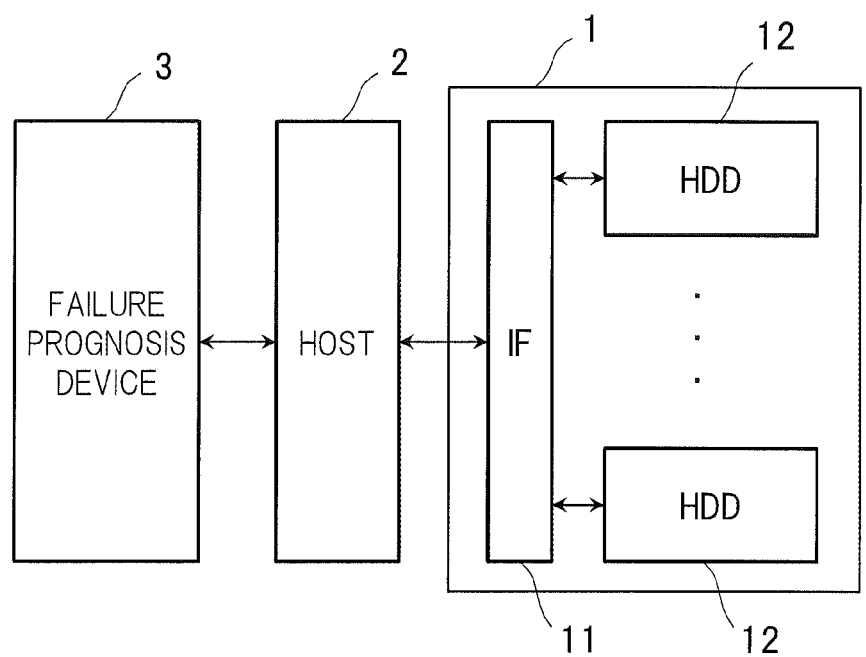
FIG. 1 is a diagram illustrating one example of a storage system according to a first embodiment.

A storage system according to a first embodiment will be described with reference to FIGS. 1-11. FIG. 1 is a diagram illustrating one example of the storage system according to the first embodiment. As illustrated in FIG. 1, the storage system includes a storage 1, a host 2, and a failure prognosis device 3.

The storage 1 includes a storage interface (IF) 11, and Hard Disk Drives (HDDs) 12.

The storage IF 11 is an interface for connecting the storage 1 to an external device. In the first embodiment, the storage IF 11 connects the storage 1 to the host 2, thereby controlling transmission and reception of information between the storage 1 and the host 2. The storage IF 11 may be equipped with a function of a Redundant Arrays of Independent Disks (RAID) controller.

The HDD 12 is a storage that stores data. The storage 1 may include one or three or more HDDs 12, though the two HDDs 12 are provided in the example of FIG. 1.

Figure 2:
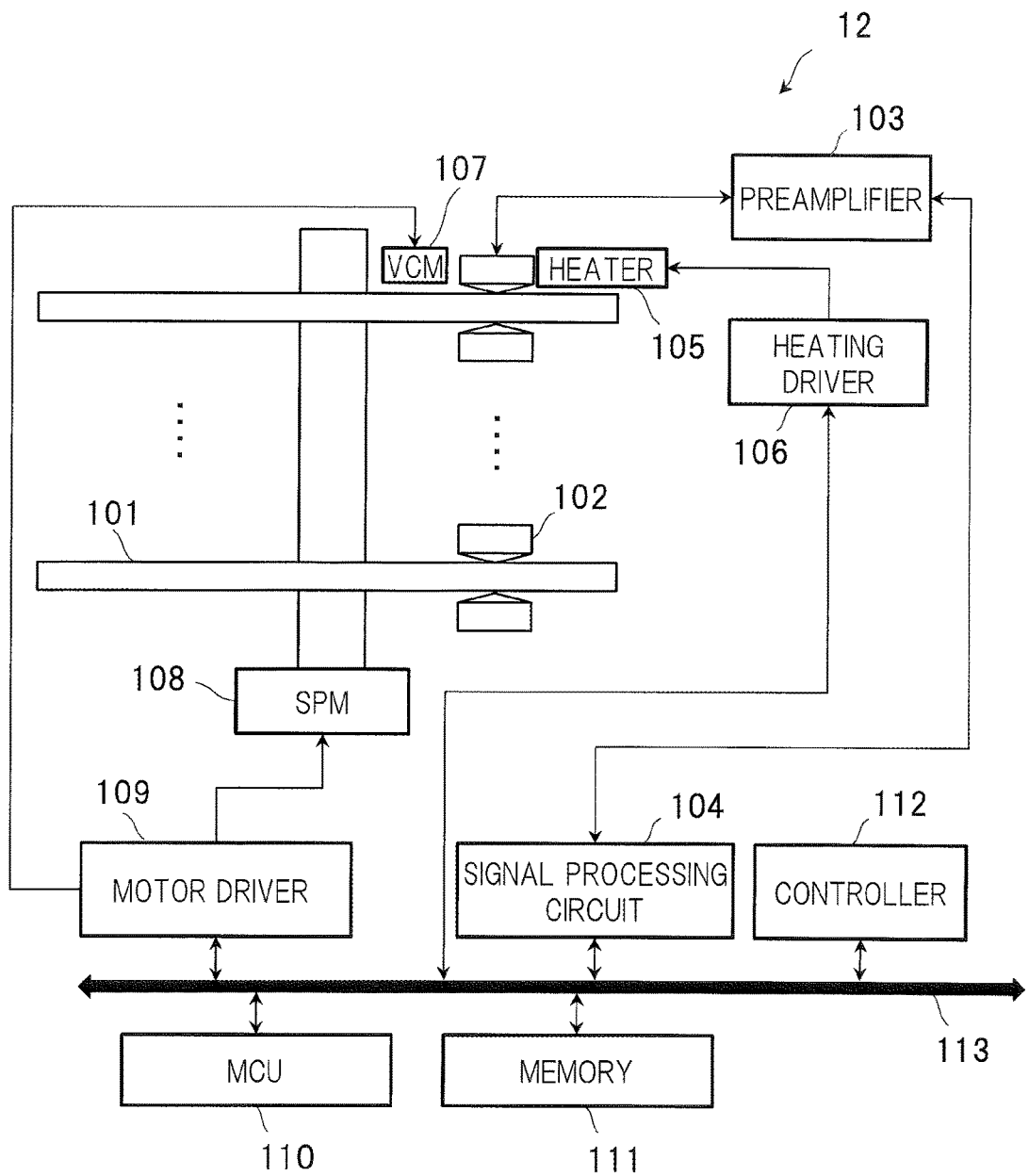
FIG. 2 is a diagram illustrating one example of a HDD in FIG. 1.

FIG. 2 is a diagram illustrating one example of the HDD 12. As depicted in FIG. 2, the HDD 12 includes a platter 101, a head 102, a preamplifier (head amplifier) 103, a signal processing circuit (read channel) 104, a heater 105, a heating driver 106, a Voice Coil Motor (VCM) 107, a Spindle Motor (SPM) 108, a motor driver 109, a Micro Control Unit (MCU) 110, a memory 111, a controller 112, and an internal bus 113.

The platter 101 is a magnetic disk (recording medium) that stores the written data. The HDD 12 is equipped with one or a plurality of platters 101. In the example of FIG. 2, the platter 101 has disk surfaces, both of which are storage surfaces enabled to store the data; and, however, only one disk surface may be the storage surface.

The head 102 is provided on each storage surface of the platter 101. When reading the data, the head 102 scans the storage surface of the platter 101 in a state of being slightly afloat above the storage surface of the platter 101, and outputs an electric signal (which will hereinafter be termed a "reproducing signal") corresponding to a magnetic field on the storage surface of the platter 101. The reproducing signals become timewise continuous analog signals.

When writing the data, the head 102 scans the storage surface of the platter 101 in the state of being slightly afloat above the storage surface of the platter 101, and magnetizes the storage surface of the platter 101 corresponding to a supplied electric signal (which will hereinafter be termed a "write signal"). The data corresponding to the write signal is thereby stored on the storage surface of the platter 101.

When reading the data, the preamplifier 103 amplifies the reproducing signal outputted by the head 102 at a predetermined gain, and inputs the amplified reproducing signal to the signal processing circuit 104. When writing the data, the preamplifier 103 amplifies the write signal inputted from the signal processing circuit 104 at the predetermined gain, and supplies the amplified write signal to the head 102.

Figure 3:
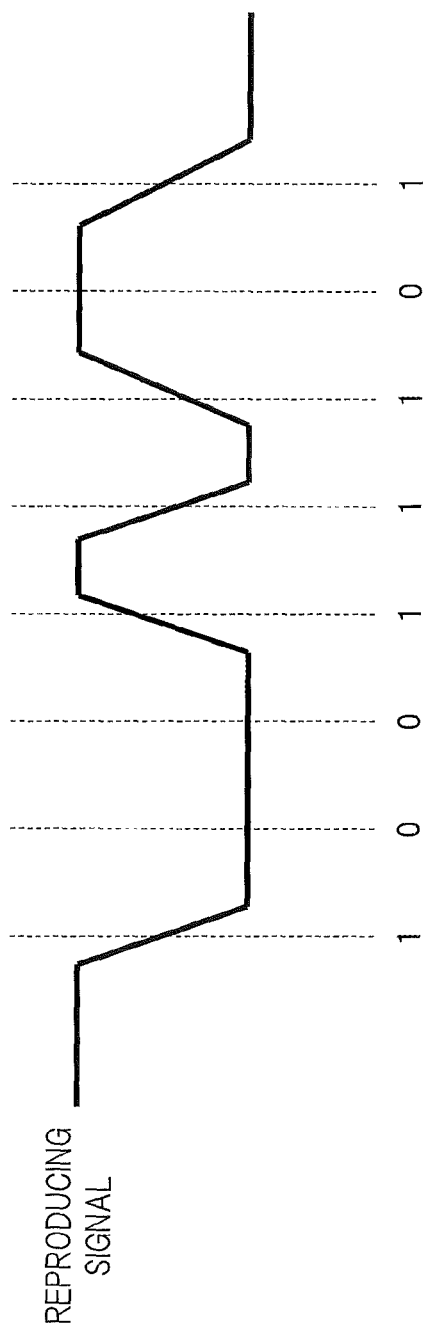
FIG. 3 is an explanatory diagram of signal processing by a signal processing circuit.

When reading the data, the signal processing circuit 104 applies predetermined signal processing to the reproducing signal inputted via the preamplifier 103, and thus reads the data stored on the platter 101. For example, the signal processing circuit 104 samples the reproducing signals as in FIG. 3 at a predetermined time interval, and converts the sampled signals into digital values (data). In the example of FIG. 3, the reproducing signal is converted such that a signal level varies at points "1" and becomes constant at points "0". With this conversion, binary data "10011101" is read out.

When writing the data, the signal processing circuit 104 generates the write signal corresponding to the data written to the platter 101, and inputs the generated write signal to the preamplifier 103.

The heater 105 heats the head 102, corresponding to the supplied electric current, and varies a floating quantity of the head 102 above the storage surface of the platter 101.

The heating driver 106 supplies the electric current to the heater 105. The heating driver 106 controls the floating quantity of the head 102 by varying an amount of the current that is supplied to the heater 105.

The VCM 107 drives a head arm supporting the head 102, thereby moving the head 102 to a predetermined position.

The SPM 108 rotates a rotary spindle common to the platter 101 of the HDD 12 at a predetermined number of rotations.

The motor driver 109 drives the VCM 107 and the SPM 108, and controls the number of rotations of each of the VCM 107 and the SPM 108. The motor driver 109 thereby controls the position of the head 102 and the number of rotations of the platter 101.

The MCU 110 executes firmware, thereby controlling the HDD 12.

The memory 111 stores the firmware.

The controller 112 is an interface that connects the HDD 12 to the external device. In the first embodiment, the controller 112 establishes a connection between the HDD 12 and a control device 15, thereby controlling transmission and reception of information between the HDD 12 and the control device 15.

The signal processing circuit 104, the heating driver 106, the motor driver 109, the MCU 110, the memory 111 and the controller 112 are interconnected via the internal bus 113.

The host 2 is a computer to manage the storage 1. The host 2 is configured by, e.g., a server or another equivalent apparatus connected to the storage 1. The host 2 is enabled to write the data to the predetermined HDD 12 and to read the data stored in the predetermined HDD 12 via the storage interface 11.

Figure 4:
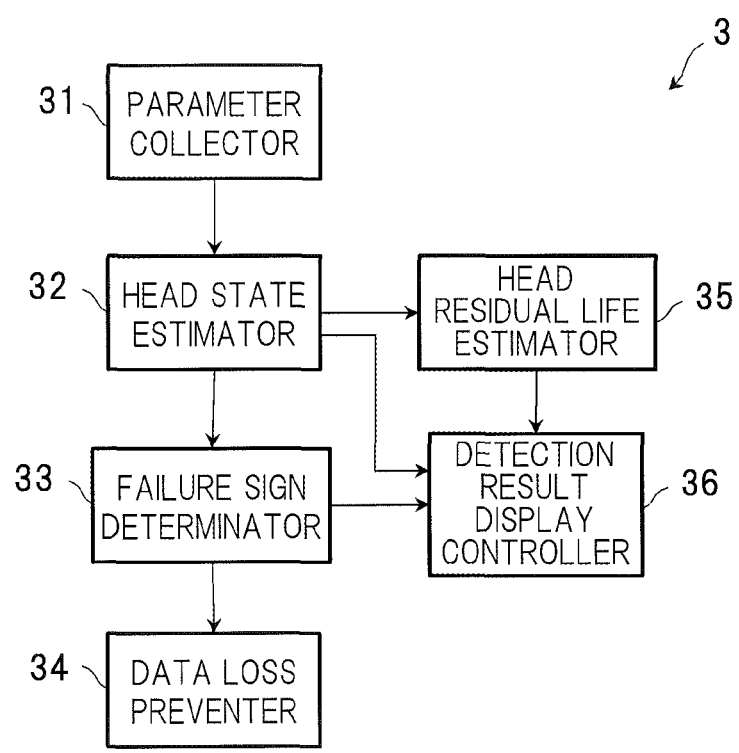
FIG. 4 is a diagram illustrating one example of a functional configuration of a failure prognosis device according to the first embodiment.

The failure prognosis device 3 (which will hereinafter be simply termed the "prognosis device 3") detects a sign of failure (which will hereinafter be simply referred to as the "sign") of each head 102 contained in the storage 1. FIG. 4 is a diagram illustrating one example of a functional configuration of the prognosis device 3 according to the first embodiment. As illustrated in FIG. 4, the prognosis device 3 includes a parameter collector 31, a head state estimator 32, a failure sign determinator 33, a data loss preventer 34, a head residual life estimator 35, and a detection result display controller 36.

The parameter collector 31 (which will hereinafter be simply termed the "collector 31") collects parameter information about each of the heads 102 contained in the storage 1. The collector 31 may collect the parameter information directly from the storage 1 and may also collect the parameter information from the storage 1 via the host 2. The collector 31 may calculate, based on the collected parameter information, other items of parameter information.

The collector 31 collects the parameter information at every predetermined time interval (e.g., every 1-hour interval). The parameter information collected by the collector 31 contains parameter information to be acquired when each head 102 executes the process of reading the data.

Each HDD 12 of the storage 1 is therefore requested to execute the data read process at every predetermined time interval in order for the collector 31 to collect the parameter information. This read process may be executed upon a request from the collector 31, and may also be executed automatically by the storage 1.

The collector 31 may collect the most updated (present) parameter information from the storage 1 each time the storage 1 executes the read process. The collector 31 may collect the parameter information at every predetermined time interval, which is stored in a predetermined area of the memory 111 or the platter 101 by the storage 1, at an arbitrary timing for detecting the sign. In all cases, the collector 31 can collect the parameter information at every predetermined time interval.

Note that it is preferable for each head 102 to read the data stored in the same area on the storage surface each time in the read process described above. This is because accuracy of history data of the parameter information is improved by collecting the parameter information under the same condition each time.

The parameter information of each head 102, which is collected by the collector 31, contains at least one of a signal quality value, an initial value of the signal quality value, a variation of the signal quality value, a floating quantity, an initial value of the floating quantity, and a variation of the floating quantity of each head 102. Herein, an in-depth description of each item of parameter information will be made.

The signal quality value is a value based on an error between the reproducing signal outputted from the head 102 when reading the data and a target signal corresponding to the reproducing signal. The target signal connotes an idealistic reproducing signal that is outputted from the head when reading the data. The target signal can be uniquely generated corresponding to the data to be read.

Figure 5:
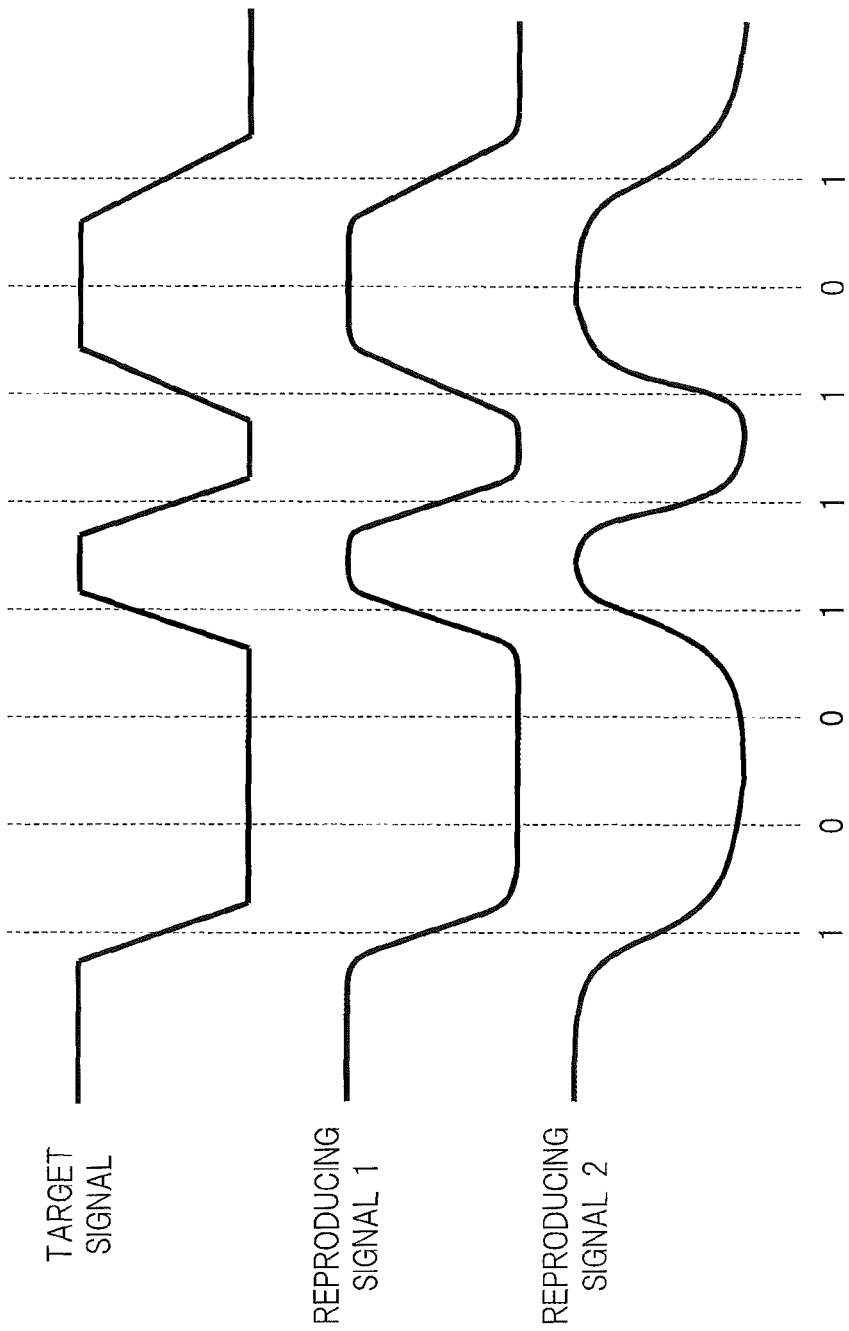
FIG. 5 is a chart illustrating a relationship between a reproducing signal and a target signal.

Herein, FIG. 5 is a chart illustrating a relationship between the reproducing signal and the target signal. An example of FIG. 5 indicates the reproducing signals 1, 2 and the target signal each corresponding to the data "10011101". The reproducing signal 1 is one example of the reproducing signal outputted by the head 102 in a satisfactory state, while the reproducing signal 2 is one example of the reproducing signal outputted by the head 102 in a deteriorated state.

As illustrated in FIG. 5, when the head 102 is in the satisfactory state, the reproducing signal 1 has a waveform approximate to a waveform of the corresponding target signal, resulting in a decreased error between the reproducing signal and the target signal.

Whereas when the head 102 is in the deteriorated state, the reproducing signal 2 has the waveform diverging from the waveform of the corresponding target signal, resulting in an increased error between the reproducing signal 2 and the target signal.

As stated above, the signal quality value is the value corresponding to the error between the reproducing signal and the target signal. Accordingly, the signal quality value becomes the value corresponding to the state of the head 102.

The collector 31 collects the reproducing signals of the respective heads 102 and the target signals from the storage 1 and may calculate, based on the collected reproducing signals and the target signals, the signal quality values of the individual heads 102. The collector 31 may also collect the signal quality values of the respective heads 102, which are calculated by the HDDs 12.

Note that the target signal for calculating the signal quality value may be generated from the reproducing signal and may also be generated from the data read from the reproducing signal. Each head 102 performs reading from the same area on the storage surface each time, in which case the target signal corresponding to the data stored in this area may be stored in a predetermined area of the memory 111 of each HDD 12 or a predetermined area of the platter 101 beforehand.

The initial value of the signal quality value is the signal quality value serving as a reference of the variation of the signal quality value. The initial value of the signal quality value may be the signal quality value calculated for the first time since the HDD 12 has started operating, and may also be the oldest signal quality value collectable by the collector 31. It may be sufficient that the initial value of the signal quality value is the signal quality value acquired at an initial stage of the operation within approximately 1000 hours since the HDD 12 has started operating, and an average value of the signal quality values acquired for an arbitrary period within the initial stage of the operation may also be used as the initial value.

The collector 31 may collect the initial value of the signal quality value from the storage 1 at every predetermined time interval or a timing for detecting the sign, and may not collect after collecting only once the initial value of the signal quality value and storing the collected initial value.

The variation of the signal quality value connotes a difference between the signal quality value at every predetermined time interval and the initial value of the signal quality value. The collector 31 calculates the difference between the signal quality value at every predetermined time interval and the initial value of the signal quality value, and is thereby enabled to collect the variation of the signal quality value at every predetermined time interval.

The floating quantity of the head 102 is a value corresponding to a distance to the head 102 from the storage surface of the platter 101 when reading the data. The floating quantity of the head 102 is controlled by the heating driver 106, and hence the collector 31 can collect the floating quantity of the head 102 from the heating driver 106. The collector 31 collects, e.g., a control value of the heating driver 106 as the floating quantity of the head 102. The control value of the heating driver 106 contains the amount of current supplied to the heater 105. Another method for measuring the floating quantity of the head 102 may involve measuring a harmonic component contained in the reproducing signal.

The initial value of the floating quantity is a floating quantity serving as a reference of the variation of the floating quantity. The initial value of the floating quantity may be the floating quantity collected for the first time since the HDD 12 has started operating, and may also be the oldest floating quantity collectable by the collector 31. It may be sufficient that the initial value of the floating quantity is the floating quantity acquired at the initial stage of the operation within approximately 1000 hours since the HDD 12 has started operating, and an average value of the floating quantities acquired for an arbitrary period within the initial stage of the operation may also be used as the initial value.

The collector 31 may collect the initial value of the floating quantity from the storage 1 at every predetermined time interval or the timing for detecting the sign, and may not collect after collecting only once the initial value of the floating quantity and storing the collected initial value.

The variation of the floating quantity connotes a difference between the floating quantity at every predetermined time interval and the initial value of the floating quantity. The collector 31 calculates the difference between the floating quantity at every predetermined time interval and the initial value of the floating quantity, and is thereby enabled to collect the variation of the floating quantity at every predetermined time interval.

The collector 31 outputs the collected parameter information of the individual heads 102. The outputted parameter information of the respective heads 102 is inputted to the head state estimator 32.

The head state estimator 32 (which will hereinafter be simply termed the "estimator 32") calculates an estimation value p for estimating the state of each head 102, based on the parameter information, collected by the collector 31, about the respective heads 102 and on an estimation model for estimating the state of the head 102. The estimation model can involve using, e.g., a multivariate logistic regression model given below.

[Mathematical Expression 1]

$$P = \frac{1}{1 + \exp(-(\beta_0 + \beta_1 \cdot x_1 + \cdots + \beta_n \cdot x_n))} \quad (1)$$

In the mathematical expression (1), $x_i$ (i=1 to n) denotes a parameter, $\beta_j$ (j=0 to n) represents a coefficient. A value of the coefficient $\beta_j$ is obtained by an experiment and other equivalent methods. The estimation value p is normalized and is equal to or larger than 0 but equal to or smaller than 1.

The estimator 32 substitutes the signal quality of each head 102 at every predetermined time interval, the variation of the signal quality value, the floating quantity, and the variation of the floating quantity into the mathematical expression (1) given above, whereby the estimation value p of each head 102 at every predetermined time interval can be calculated.

The estimation value p is to become closer to 0 as the head 102 reaches a more satisfactory state, but is to become closer to 1 as the head 102 reaches a more deteriorated state. In this case, the estimation value p is equivalent to a failure probability of the head 102, in which "p=1" indicates a failure of the head 102.

The estimator 32 outputs the calculated estimation value p of each head 102. The outputted estimation value p of each head 102 is inputted to the failure sign determinator 33, the head residual life estimator 35 and the detection result display controller 36.

The failure sign determinator 33 (which will hereinafter be simply termed the "determinator 33") determines whether the sign exists in each head 102 on the basis of the estimation value p, calculated by the estimator 32, of each head 102, and outputs a determined result. The determined result of the determinator 33 corresponds to a detected result of the prognosis device 3. In other words, an event of the determinator 33 determining the existence of the sign corresponds to an event of the sign being detected.

As described above, the estimation value p becomes larger as the state of the head 102 is more deteriorated, in which case the determinator 33 determines that the sign exists when the estimation value p is equal to or larger than a threshold value but determines that the sign does not exist whereas when smaller than the threshold value.

By contrast, the estimation value p becomes smaller as the state of the head 102 is more deteriorated, in which case it may be sufficient that the determinator 33 determines that the sign exists when the estimation value p is equal to or smaller than the threshold value but determines that the sign does not exist whereas when exceeding the threshold value.

The determinator 33 outputs the determined result of each head 102. The outputted determined result of each head 102 is inputted to the data loss preventer 34 and the detection result display controller 36.

The data loss preventer 34 (which will hereinafter be simply termed the "loss preventer 34") preserves the data stored in the platter 101, corresponding to the determined result of the determinator 33. For example, when a certain head 102 is determined to have the sign, the loss preventer 34 preserves the data to be read by this head 102. The data to be read by the head 102 connotes the data stored on the storage surface of the platter 101 provided with the head 102.

More specifically, the loss preventer 34 preserves the data by copying the data to be read by the head 102 determined to have the sign to another storage surface. Another storage surface connotes the storage surface, from which the data is read by the head 102 other than the head 102 determined to have the sign, in the storage surfaces contained in the storage 1.

Another storage surface may be a storage surface on the side opposite to the storage surface provided with the head 102 determined to have the sign, may also be a storage surface of the platter 101 different from the platter 101 provided with the head 102 determined to have the sign, and may further be a storage surface contained in the HDD 12 different from the HDD 12 equipped with the head 102 determined to have the sign.

It is preferable that another storage surface is a storage surface provided with the head 102 in the satisfactory state. The storage surface provided with the head 102 in the satisfactory state comprises a storage surface provided with the head 102 determined not to have the sign, and a storage surface provided with the had 102, of which the estimation value p is equal to or smaller than a predetermined value. The loss preventer 34 acquires the estimation value p of each head 102 from the estimator 32, and is thereby enabled to select the storage surface with the head 102 being in the satisfactory state, based on the acquired estimation value p.

It is further preferable that another storage surface is a storage surface having a small error rate. The loss preventer 34 collects the error rates of the respective storage surfaces from the storage 1, and is thereby enabled to select the storage surface having the small error rate, based on the collected error rates.

Note that a data preserving method by the loss preventer 34 is not limited to the method described above. The loss preventer 34 may store a plurality of preserving methods in a lookup table and other equivalent databases, and may select the preserving method to be implemented corresponding to an ID of the head 102 with the sign being detected, the estimation value p and other equivalent values of each head 102.

The head residual life estimator 35 (which will hereinafter be simply termed the "estimator 35") estimates a residual life of each head 102 on the basis of the history data of the estimation values p of the respective heads 102. In other words, the estimator 35 calculates an estimation value of the residual life (which will hereinafter be referred to as an "estimation residual life") of each head 102. The estimation residual life connotes an estimation value of residual time till the head 102 gets into the failure.

The estimator 35 calculates such estimation failure time that the estimation value p becomes 1 from, e.g., the history data of the estimation values p by extrapolation, and calculates a period of time up to the estimation failure time from the present time as the estimation residual life. The estimator 35 may, though a linear approximation can be used as the extrapolation, employ other methods. The estimator 35 may also calculate only the estimation residual life of the head 102 determined to have the sign, and may further calculate the estimation residual lives of all the heads 102.

The estimator 35 outputs the calculated estimation residual life of the head 102. The outputted estimation residual life of the head 102 is inputted to the detection result display controller 36.

The detection result display controller 36 (which will hereinafter be simply termed the "display controller 36") generates image data on the basis of the items of information inputted from the estimator 32, the determinator 33 and the estimator 35, and displays an image corresponding to the generated image data on a display. The display controller 36 displays at least one of the history data of the estimation value p, the determination result and the estimation residual life of the head 102.

Figure 6:
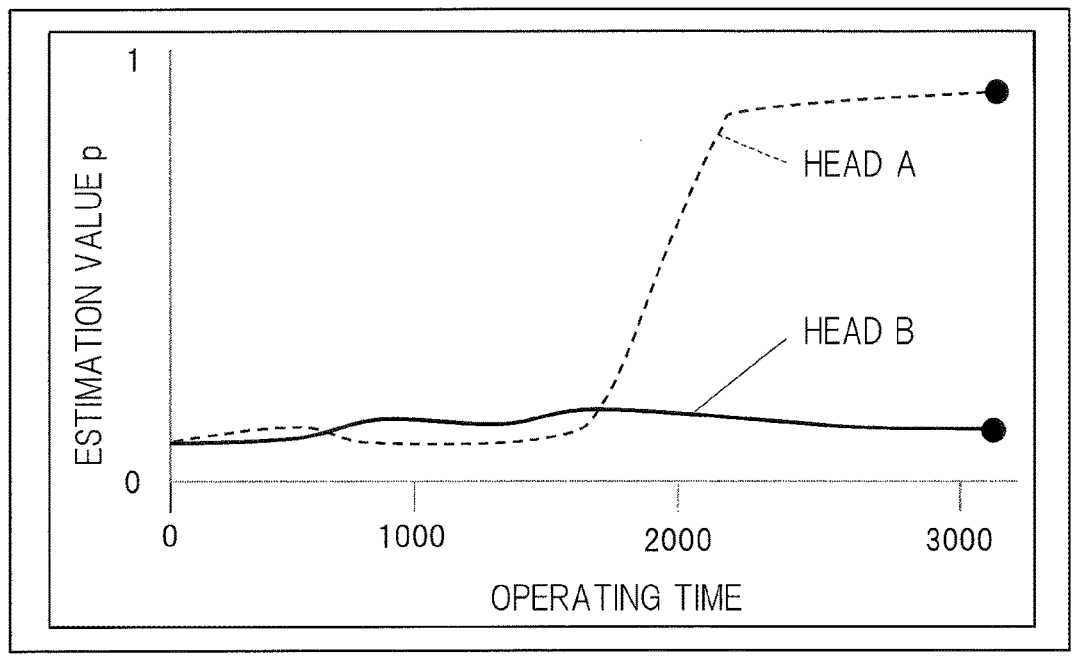
FIG. 6 is a diagram illustrating one example of an image displayed on a display.
Figure 7:
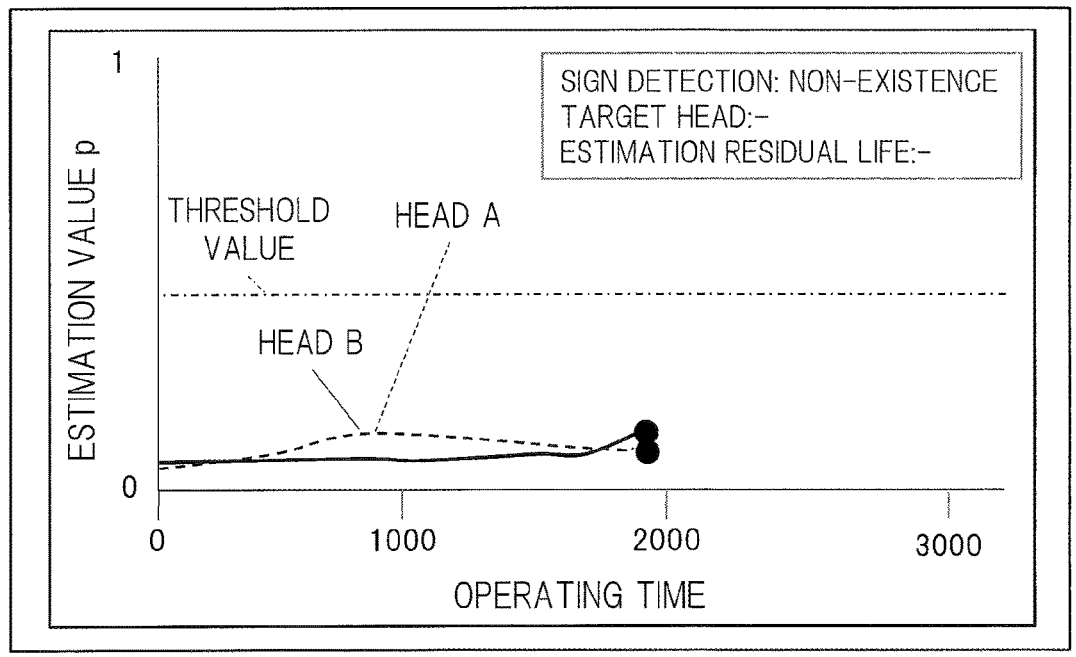
FIG. 7 is a diagram illustrating one example of the image displayed on the display.
Figure 8:
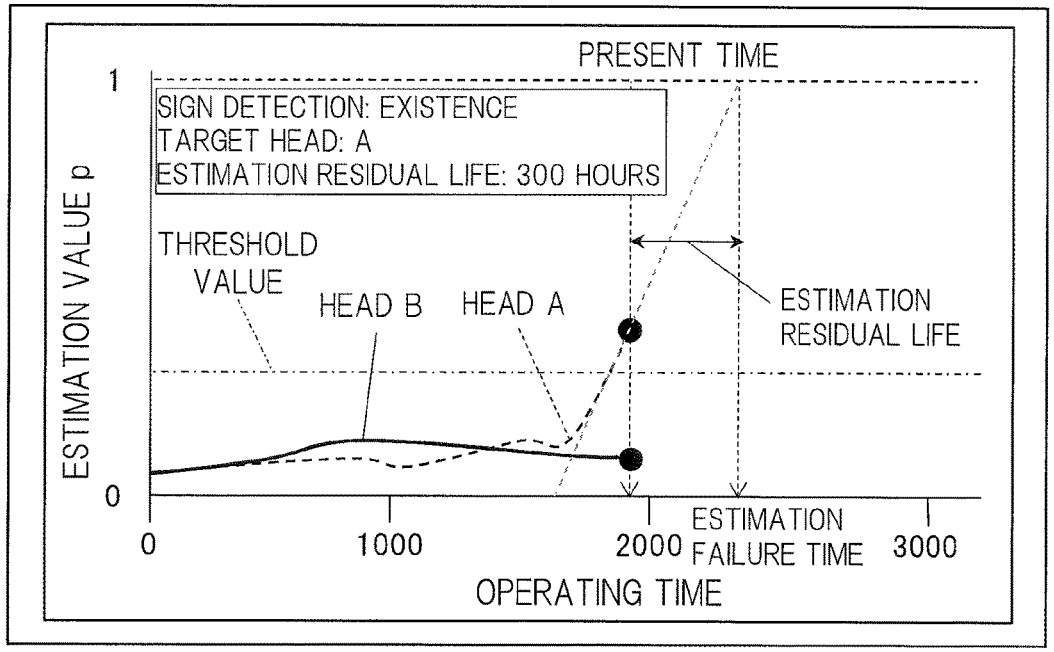
FIG. 8 is a diagram illustrating one example of the image displayed on the display.

Herein, each of FIGS. 6-8 illustrates one example of the image displayed on the display.

In the example of FIG. 6, the history data of the estimation values p, calculated at every predetermined time interval, of the heads A, B equipped in a certain HDD 12 are displayed as a graph. The axis of abscissa of the graph indicates operating time, while the axis of ordinate indicates the estimation value p. In FIG. 6, the history data of the estimation value p of the head A is displayed by a broken line, while the history data of the estimation value p of the head B is displayed by a solid line.

In the example of FIG. 7, there are further displayed a threshold value for determining whether the sign exists and a result of determining whether the sign exists. In FIG. 7, the threshold value is indicated by a one-dotted chain line. In the example of FIG. 7, both of the estimation values p of the heads A, B are smaller that the threshold value, and hence the heads A, B are determined not to have the sign. Consequently, "non-existence" is entered in a "sign detection" field indicating the result of determining whether the sign exists.

In contrast with this, in the example of FIG. 8, the head A has the estimation value p equal to or larger than the threshold value, and is therefore determined to have the sign. Hence, "existence" is entered in the "sign detection" field, and "A" is entered in a "target head" field indicating the head 102 with the sign being detected.

The estimation residual life of the head A with the sign being detected is calculated at 300 hours. Consequently, "300 hours" is displayed in an "estimation residual life"

field. In FIG. 8, the estimation residual life of the head A is calculated as a period of time up to the estimation failure time from the present time as described above.

Herein, a hardware configuration of the prognosis device 3 will be described with reference to FIG. 9. The prognosis device 3 according to the first embodiment is configured by a computer 200. The computer 200 comprises a server, a client, a microcomputer, and a general purpose computer.

Figure 9:
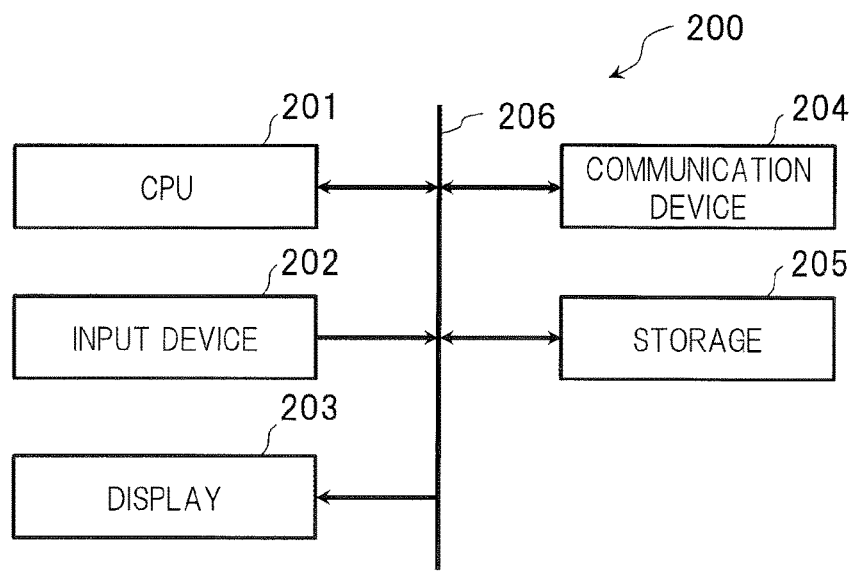
FIG. 9 is a diagram illustrating one example of a hardware configuration of the failure prognosis device according to the first embodiment.

FIG. 9 is a diagram illustrating one example of the computer 200. As depicted in FIG. 9, the computer 200 includes a Central Processing Unit (CPU) 201, an input device 202, a display 203, a communication device 204 and a storage 205. The CPU 201, the input device 202, the display 203, the communication device 204 and the storage 205 are interconnected via a bus 206.

The CPU 201 is circuitry such as an electronic circuitry including a controller and an arithmetic device of the computer 200. The CPU 201 executes an arithmetic process based on data inputted from the respective devices (e.g., the input device 202, the communication device 204 and the storage 205) that are interconnected via the bus 106 and based on a program. An arithmetic result and the control signal are outputted via the bus 106 to the respective devices (e.g., the display 203, the communication device 204 and the storage 205) that are interconnected via the bus 106. Specifically, the CPU 201 runs an Operating System (OS) of the computer 200 and a failure prognosis program, thereby controlling the individual devices configuring the computer 200.

The failure prognosis program (which will hereinafter be simply termed the "prognosis program") is a program for causing the computer 200 to implement the foregoing respective functional configurations of the failure prognosis device. The prognosis program is stored on a non-transitory tangible computer readable storage medium. The storage medium described above is exemplified by an optical disk, a magneto-optic disk, a magnetic disk, a magnetic tape, a flash memory and a semiconductor memory, but is not limited to these mediums. The CPU 201 runs the prognosis program, whereby the computer 200 functions as the failure prognosis device.

The input device 202 is a device for inputting the information to the computer 200. The input device 202 is exemplified by a keyboard, a mouse and a touch panel, but is not limited to these devices.

The display 203 is a device for displaying the images and videos. The display 203 is exemplified by a Liquid Crystal Display (LCD), a Cathode-Ray Tube (CRT) and a Plasma Display Panel (PDP), but is not limited to these displays. The display controller 36 can display the images as in FIGS. 6-8 through the display 203.

The communication device 204 is a device for the computer 200 to perform communications wirelessly or wiredly with the external device. The communication device 204 is exemplified by a modem, a hub and a router, but is not limited to these devices. The collector 31 may collect the information instanced by the parameter information from the external device via the communication device 204.

The storage 205 is a storage medium that stores the OS of the computer 200, the prognosis program, data needed for running the prognosis program, and data generated by running the prognosis program. The storage 205 includes a main storage and an external storage. The main storage is exemplified by a Random Access Memory (RAM), a Dynamic RAM (DRAM) and a Static RAM (SRAM), but is not limited to these memories. The external storage is exemplified by the hard disk, the optical disk, the flash memory and the magnetic tape, but is not limited to these storages.

Note that the computer 200 may include one or a plurality of CPUs 201, input devices 202, displays 203, communication devices 204 and storages 205, respectively, and peripheral devices instanced by a printer and a scanner may also be connected to the computer 200.

The prognosis device 3 may be configured by the signal computer 200, may also be configured as a system by a plurality of interconnected computers 200, may further be configured by the same computer 200 as the host 2, and may still further be configured by the computer 200 different from the host 2.

The prognosis program may be previously stored on the storage 205 of the computer 200, may also be stored on an external storage medium of the computer 200, and may further be uploaded on the Internet. In all cases, the function of the prognosis device 3 is implemented by installing the prognosis program into the computer 200 and running the prognosis program on the computer 200.

Figure 10:
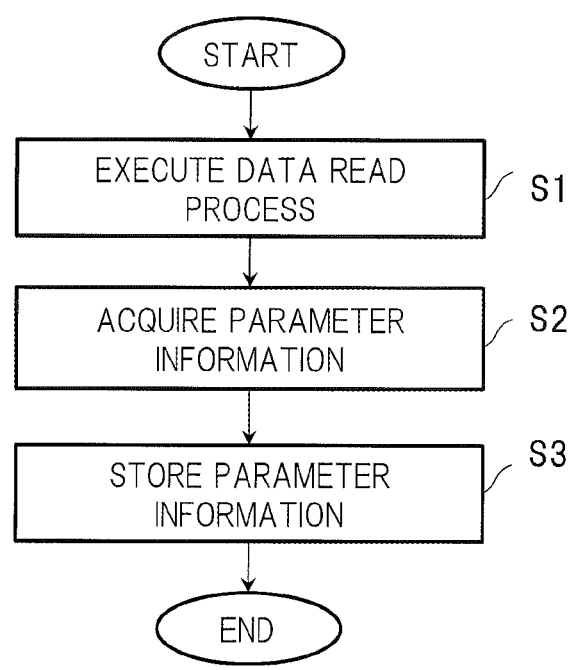
FIG. 10 is a flowchart illustrating one example of an operation of a storage in FIG. 1.
Figure 11:
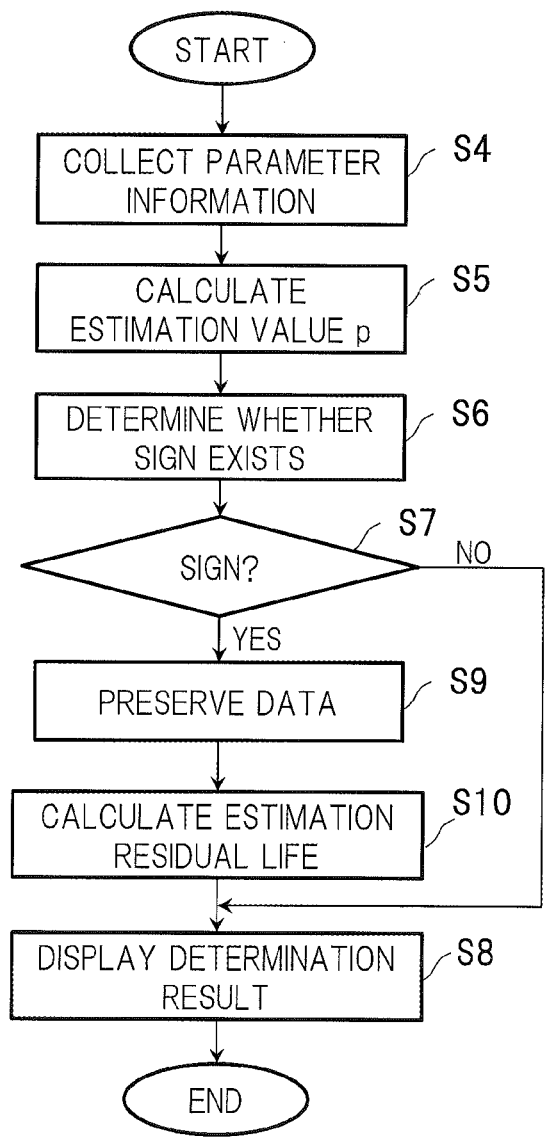
FIG. 11 is a flowchart illustrating one example of the failure prognosis device according to the first embodiment.

Next, an operation of a storage system according to the first embodiment will be described with reference to FIGS. 10 and 11.

To start with, an operation of the storage 1 will be specifically described. FIG. 10 is a flowchart illustrating one example of the operation of the storage 1. The storage 1 according to the first embodiment executes processes illustrated in FIG. 10 at every predetermined time interval (e.g., at every one hour interval).

At first, each HDD 12 of the storage 1 executes a process of reading the data by each head 102 (step S1). In this read process, it is preferable for each head 102 to read the data stored in the predetermined area on the storage surface. The reproducing signal is outputted from each head 102 by the read process.

Next, each HDD 12 acquires the parameter information of each head 102 (step S2). Each HDD 12 calculates the signal quality value of each head 102 on the basis of the reproducing signal outputted from each head 102 and the target signal corresponding to the reproducing signal. Each HDD 12 acquires the floating quantity of the head 102.

Subsequently, the HDD 12 stores the acquired parameter information of the head 102 in a management area of the platter 101 (step S3). The management area is a predetermined area that is set for storing the history data of the parameter information. As stated above, the parameter information may also be stored in the memory 111 in place of the management area.

The storage 1 iterates the operation described above at every predetermined time interval, thereby storing the history data of the parameter information, given at every predetermined time interval, of the head 102 in the management area of the platter 101 of the HDD 12. The oldest signal quality value stored in the management area corresponds to the initial value of the signal quality value, and the oldest floating quantity stored in the management area corresponds to the initial value of the floating quantity.

The HDD 12 may calculate the variation of the signal quality value on the basis of the signal quality value acquired in step S2 and the initial value of the signal quality value stored in the management area, and may store the calculated variation in the management area. Similarly, the HDD 12 may calculate the variation of the floating quantity on the basis of the floating quantity acquired in step S2 and the initial value of the floating quantity stored in the management area, and may store the calculated variation in the management area.

Next, the operation of the prognosis device 3 will be specifically described. FIG. 11 is a flowchart illustrating one example of the operation of the prognosis device 3. The prognosis device 3 according to the first embodiment can execute the processes illustrated in FIG. 11 at an arbitrary timing.

To begin with, the collector 31 collects the history data of the parameter information of the head 102, which is stored in the management area of the platter 101 of the HDD 12, from the storage 1 (step S4). The collector 31 may collect the parameter information directly from the storage 1, and may also collect the parameter information via the host 2. The collector 31 may calculate another item of parameter information from the collected parameter information.

Next, the estimator 32 substitute the parameter information of each of the heads 102 into the mathematical expression (1), thus calculating the estimation value p of each head 102 (step S5). The history data of the estimation value p of the head 102 is thereby obtained.

Subsequently, the determinator 33 determines whether the head 102 has the sign by comparing the estimation value p of the head 102 with the threshold value (step S6). The estimation value p to be compared with the threshold value may be only the most updated estimation value p may also be the whole history data of the estimation values p.

When all the heads 102 are determined not to have the signs (NO in step S7), the display controller 36 generates the image data containing this determination result and the estimation value p of the head 102, and displays the generated image data on the display 203 (step S8). An image as in FIG. 7 is thereby displayed on the display 203.

Whereas when one or the plurality of heads 102 are determined to have the signs (YES in step S7), the loss preventer 34 preserves the data to be read by the heads 102 determined to have the signs (step S9). The data loss preventing method is as described above.

The estimator 35 calculates the estimation residual life of the head 102 determined to have the sign, based on the history data of the estimation value p (step S10).

Thereafter, the display controller 36 generates the image data containing the result of determining whether the sign exists, the estimation value p of the head 102 and the estimation residual life of the head 102 determined to have the sign, and display the generated image data on the display 203 (step S8). An image as in FIG. 8 is thereby displayed on the display 203.

As discussed above, the failure prognosis device 3 according to the first embodiment can detect the sign of the head 102, based on the parameter information of the head 102. It is therefore feasible to properly conduct the maintenance of the storage 1.

The failure prognosis device 3 displays the sign detection result and the estimation residual life on the display 203, and is thereby enabled to notify the head 102 with its sign being detected and the estimation residual life thereof to the user.

Note that the sign detection method according to the first embodiment and the conventional sign detection method using the error rate can be used in combination. The sign is not detected by the detection method according to the first embodiment but is detected by the conventional detection method, in which case the platter 101 can be determined to have occurrence of abnormality. Namely, it is feasible to detect the sign of the head 102 and the abnormality of the platter 101, respectively.

Second Embodiment

The storage system according to a second embodiment will be described with reference to FIGS. 12-16. The second embodiment will discuss a modified example of the storage system according to the first embodiment. FIGS. 12-16 are diagrams each illustrating one example of the storage system according to the second embodiment.

Figure 12:
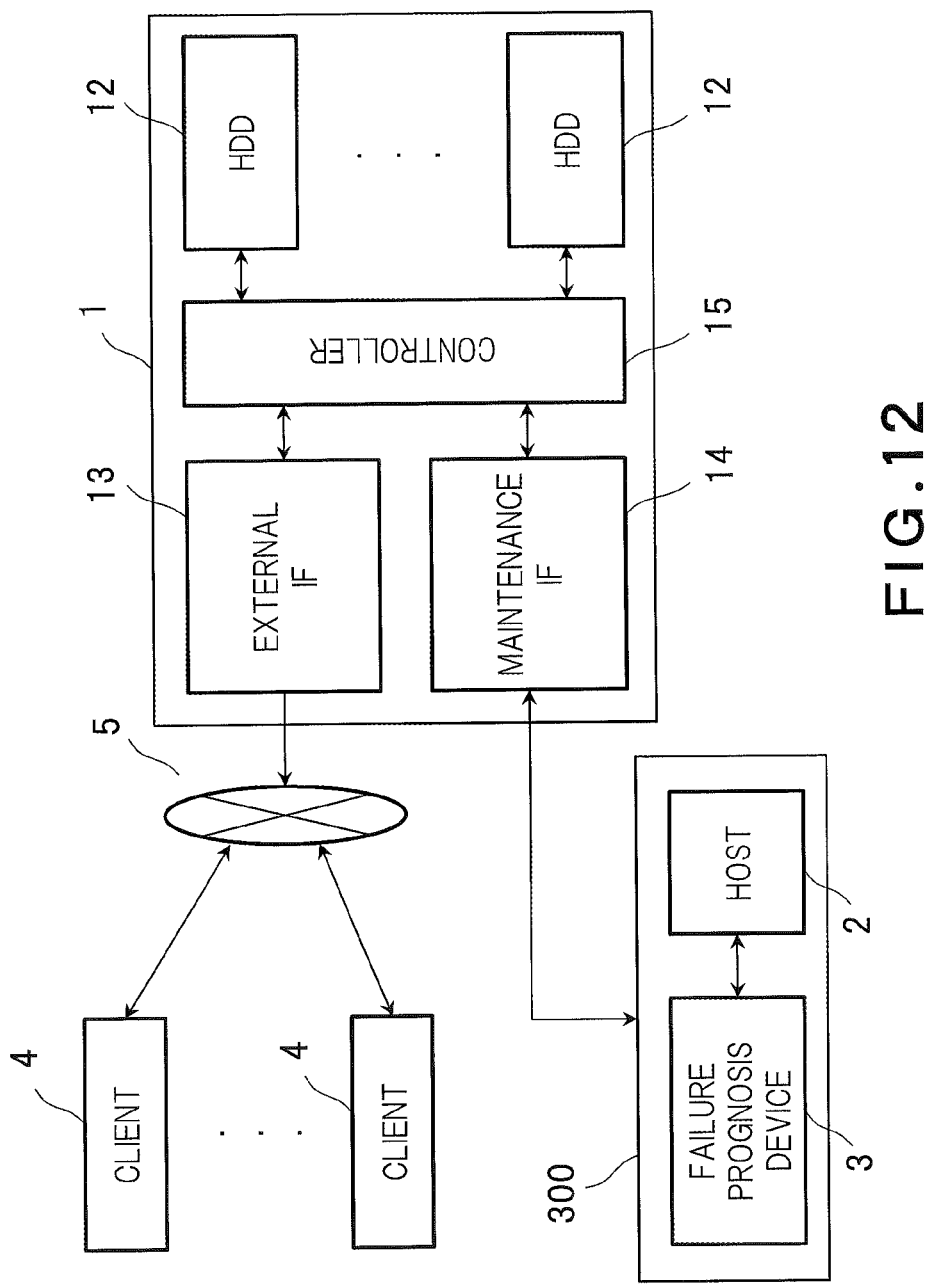
FIG. 12 is a diagram illustrating one example of a storage system according to a second embodiment.

In FIG. 12, the storage 1 includes an external interface (external IF) 13, a maintenance interface (maintenance IF) 14, and a controller 15.

The external IF 13 is connected via a network 5 to a plurality of clients 4. The external IF 13 controls transmission and reception of the information between the storage 1 and the clients 4. The user of the client 4 can access the storage 1 via the network 5 and the external IF 13.

The maintenance IF 14 is connected to a management server 300. The maintenance IF 14 controls the transmission and the reception of the information between the storage 1 and the management server 300. The maintenance IF 14 corresponds to the storage IF 11 in the first embodiment.

The controller 15 controls the external IF 13 and the maintenance IF 14.

In the example of FIG. 12, the management server 300 includes the host 2 and the prognosis device 3. The prognosis device 3 may display the detection result on a display 200 equipped in the management server 300, and may also display the detection result on a display equipped in the client 4.

Figure 13:
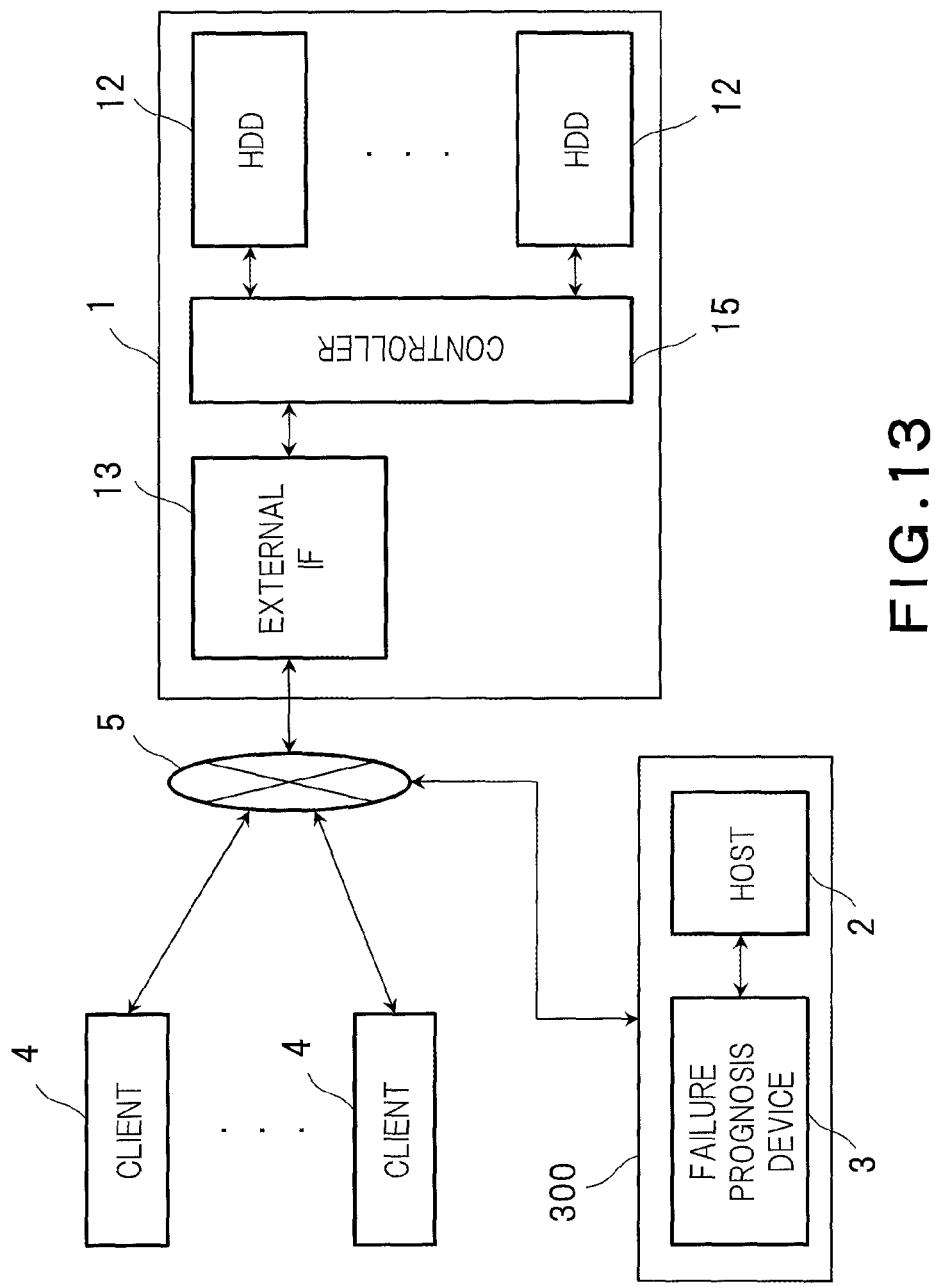
FIG. 13 is a diagram illustrating one example of the storage system according to the second embodiment.

In FIG. 13, the management server 300 is connected via the network 5 to the storage 1. The storage does not therefore include the maintenance IF 14 in FIG. 12. Other configurations are the same as those in FIG. 12. Note that the storage 1 may not include the controller 15 in the example of FIG. 13.

Figure 14:
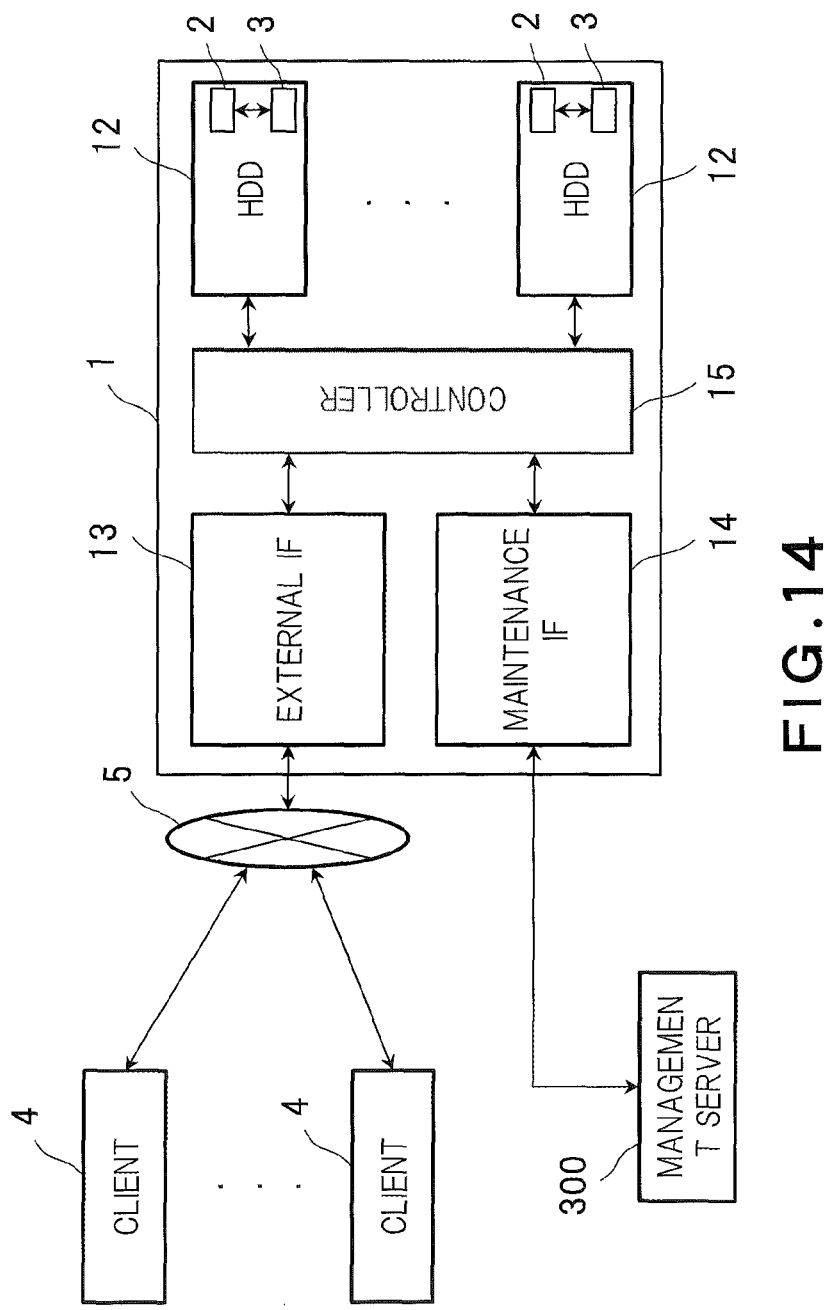
FIG. 14 is a diagram illustrating one example of the storage system according to the second embodiment.

In FIG. 14, the HDD 12 includes the host 2 and the prognosis device 3. Other configurations are the same as those in FIG. 12. In the example of FIG. 14, the host 2 and the prognosis device 3 are configured by the MCU 110 and the memory 111 equipped in the HDD 12. The prognosis device 3 detects the sign of the head 12 equipped in the HDD 12. Note that part of the HDDs 12 may not include the host 2 and the prognosis device 3.

Figure 15:
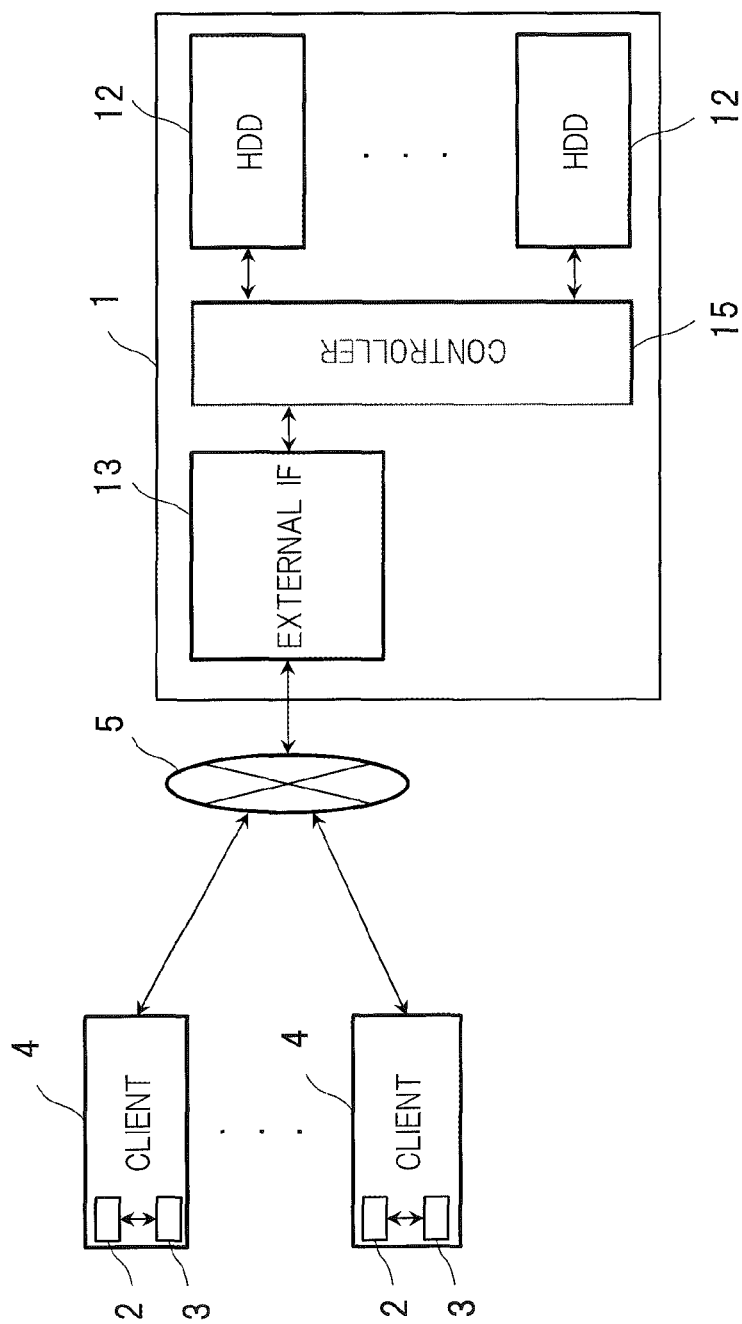
FIG. 15 is a diagram illustrating one example of the storage system according to the second embodiment.

In FIG. 15, each client 4 includes the host 2 and the prognosis device 3. The client 4 thereby functions as the management server 300, and hence the storage system does not include the management server 300. Other configurations are the same as those in FIG. 13. Note that part of the clients 4 may include neither the host 2 nor the prognosis device 3.

Figure 16:
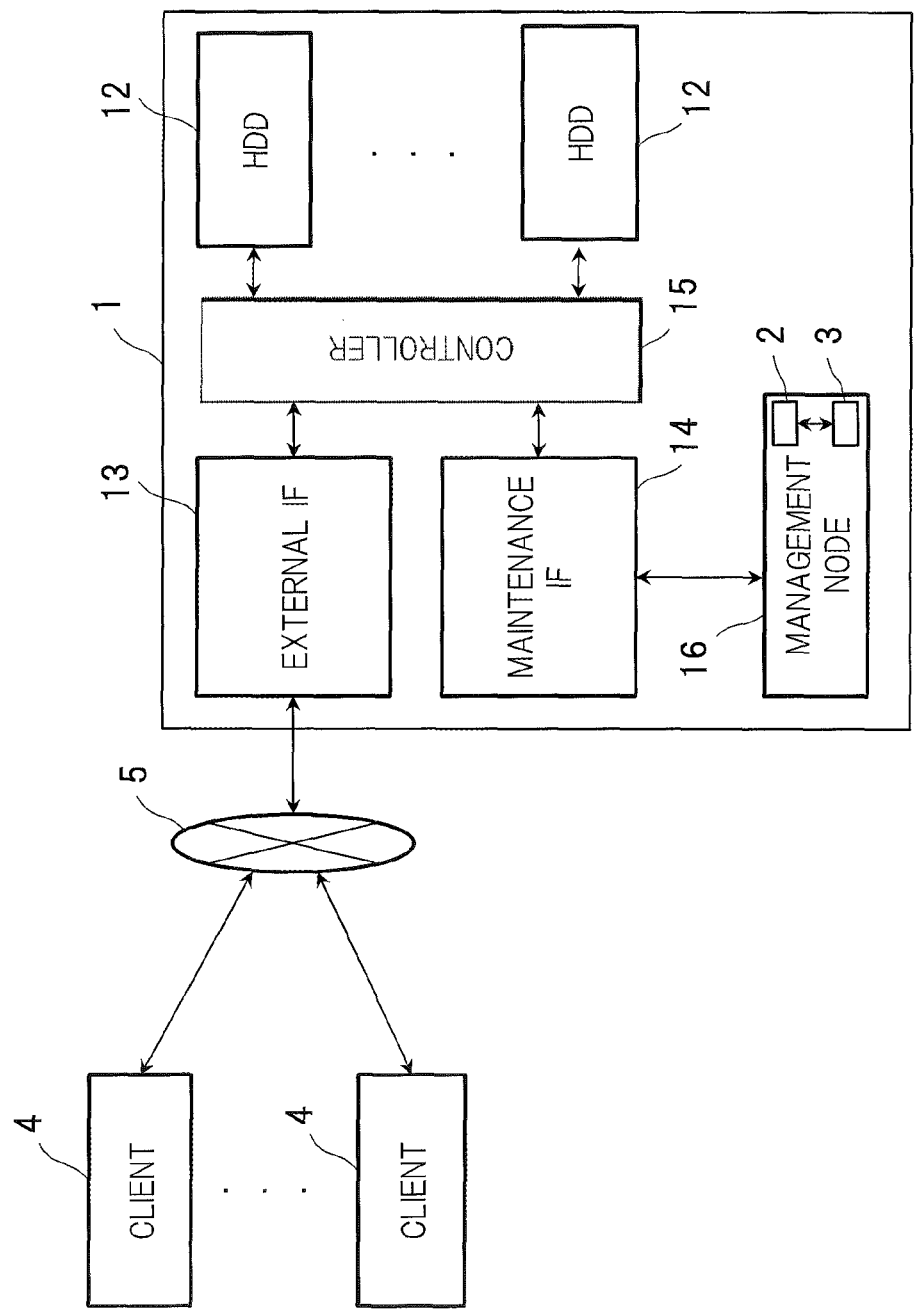
FIG. 16 is a diagram illustrating one example of the storage system according to the second embodiment.

In the example of FIG. 16, the storage 1 includes a management node 16. The management node 16 includes the host 2 and the prognosis device 3. The management node 16 functions as the management server 300, and the storage system does not therefore include the management server 300. Other configurations are the same as those in FIG. 12.

The foregoing configurations also enable the prognosis device 3 to detect the sign of the head 102 similarly to the first embodiment.

The present invention is not limited to the above described embodiments as they are, and constituent elements can be substantiated with deformation within a range not deviating from the gist thereof in a practical phase. Various inventions can be formed by appropriate combinations of the plurality of constituent elements disclosed in the above described embodiments. For example, some constituent elements can be deleted from all the constituent elements shown in the embodiments, and the elements across the different embodiments can be appropriately combined.

The invention claimed is:

1. A failure prognosis device comprising:
   circuitry configured to determine whether a sign of failure exists in a head, based on a signal quality value and a floating quantity of the head, the signal quality value being based on an error between a reproducing signal acquired from the head when reading data stored on a storage surface of a disk and a predetermined target signal, and output a determination result, wherein the circuitry is configured to preserve the data stored on the storage surface of the disk according to the determination result, and the circuitry is configured to copy the data stored on the storage surface provided with the head to another storage surface when determining that the head has the sign of failure.

2. The failure prognosis device according to claim 1, wherein the circuitry is configured to calculate an estimation value of a residual life of the head, based on history data of the evaluation value.

3. The failure prognosis device according to claim 1, further comprising a display controller configured to cause at least one of the estimation value, the determination result and the estimation value of the residual life of the head to be displayed.

4. A storage system comprising:
the failure prognosis device according to claim 1; and
a storage comprising a plurality of disks.

5. A failure prognosis method comprising:
determining whether a sign of failure exists in a head, based on a signal quality value and a floating quantity of the head, the signal quality value being based on an error between a reproducing signal acquired from the head when reading data stored on a storage surface of a disk and a predetermined target signal;

preserving the data stored on the storage surface of the disk according to the determination result by copying the data stored on the storage surface provided with the head to another storage surface when determining that the head has the sign of failure; and outputting a determination result.

6. A failure prognosis device comprising:
circuitry configured to determine whether a sign of failure exists in a head, based on a signal quality value and a floating quantity of the head, the signal quality value being based on an error between a reproducing signal acquired from the head when reading data stored on a storage surface of a disk and a predetermined target signal, and output a determination result, wherein the circuitry is further configured to calculate an estimation value of a state of the head, based on the signal quality value, the floating quantity and a multivariate logistic regression model of the state of the head.

* * * * *